Patented June 21, 1938

2,121,501

UNITED STATES PATENT OFFICE 2,121,501

HYPOCHLORITE COMPOSITION

Paul R. Hershman, Chicago, Ill., assignor, by direct and mesne assignments, to Oakite Products, Inc., New York, N. Y., a corporation of New York No Drawing. Application March 17, 1936, Serial No. 69,413

5 Claims. (Cl. 23—248)

This application is a continuation in part of my prior application, Serial Number 15,825, filed April 11, 1935.

This invention relates to a composition of matter which is useful as a disinfectant, bactericide, deodorant, and bleaching agent, as well as for other purposes and to the method for producing the same. More particularly the invention relates to a dry, stable hypochlorite reagent which will quickly and totally dissolve in water to form a solution of hypochlorites.

It is well known that hypochlorite solutions deteriorate upon standing after their preparation. Various methods have been proposed for stabilizing such solutions but such methods, in order to attain stability, necessitate sacrificing the reactivity or potency of the solution since stable solutions can be prepared only with low available chlorine concentrations.

Attempts have also been made to prepare hypochlorites in the dry form containing up to 95% available chlorine by spraying caustic soda into an atmosphere of chlorine gas, so that a reaction takes place. However, the resulting product, although dry, was not very stable.

I have discovered a new method for producing a dry composition which is stable for an indefinite period and which when mixed with water dissolves almost instantaneously to form a highly reactive hypochlorite solution.

In carrying out my invention I add to calcium hypochlorite or chloride of lime a dry acid such as tartaric, succinic, maleic or citric acid or one of the other aliphatic organic acids producing solutions of high dissociation value, or a soluble, dry inorganic acid such as boric acid; an oxidizing agent, that is, a compound capable of yielding free oxygen, such as sodium chromate, or sodium chlorate; an anhydrous alkali metal salt of an aliphatic organic acid, such as sodium acetate, sodium succinate, sodium tartrate or sodium propionate; and an alkali metal salt such as sodium chloride which will combine with the hypochlorite to form a soluble salt.

The proportion of the materials is preferably such that the alkali metal salt of the aliphatic organic acid and the aliphatic organic acid constituent react with the calcium hypochlorite to form a mixture of soluble calcium salts, sodium hypochlorite, and hypochlorous acid. The purpose of the oxidizing agent is to react further with the calcium salts to produce the clear solutions desirable. It has been found that solutions in which the oxidizing agent has been omitted will, after a time, precipitate some calcium salts from solution and cause the solutions to present a cloudy appearance. Also, such oxidizing agents tend to increase the bactericidal efficiency of such solutions.

This is perhaps due to the fact that the equilibrium balance in the solutions without the oxidizing agents causes the precipitation of the organic calcium salts and the presence of the oxidizing agents such as sodium chromate produces a further reaction in which the calcium salts further react to produce calcium chromate, which is highly soluble, and sodium acetate with sodium tartrate or one of the other metallo-organic salts.

Anhydrous sodium acetate has been found to be a particularly satisfactory salt for filling the role of the salt of the aliphatic organic acid.

The dry acid used should be such that when it reacts with the other ingredients of the composition there are formed calcium salts which are soluble to some extent in water. Such acids are maleic, malic, fumaric, citric, and tartaric.

As a specific example of a composition prepared in accordance with my invention, the following proportions of ingredients may be mixed:—

| | Parts by weight |
|---|---|
| Calcium hypochlorite | 15 to 50 |
| Tartaric acid | 3 to 10 |
| Sodium chloride | 45 to 80 |
| Sodium acetate (anhydrous) | 2 to 10 |
| Sodium chromate | .1 to 1 |
| Borax | 0 to 22 |

The amount of calcium hypochlorite used will depend upon the concentration of available chlorine desired in the material. The amount of acid used should be approximately at least sufficient to neutralize the mixture in solution, and to react with and dissolve any free lime which may be present in the hypochlorite.

The sodium chloride should be present in sufficient amount to combine with all the calcium hypochlorite to form the soluble salt corresponding to the formula $Ca(OCl)_2 2NaCl$. The sodium chloride should preferably be substantially free of magnesium, since magnesium salts formed when the mixture is dissolved in water will precipitate. Other soluble alkali metal salts which form soluble salts with calcium hypochlorite may be used instead of sodium chloride.

The borax may or may not be added. It has a beneficial effect when the composition is to be used as a cleaner or detergent.

If the solution of this material is evaporated under vaccum the calcium salts will crystallize almost quantitatively without containing any available chlorine. Thus it is apparent that a reagent which has all the desirable properties of sodium hypochlorite has been prepared, but which unlike the latter may be prepared in dry stable form. The reagent has approximately double the bactericidal strength of ordinary commercial grades of calcium hypochlorites and sodium hypochlorite solutions of equal available chlorine concentrations, this increased strength being due principally to the neutralization of the free alkali of the hypochlorite.

I claim:

1. A composition of materials comprising calcium hypochlorite, a dry water soluble aliphatic organic acid which is capable of forming calcium salts soluble in water in an amount sufficient to solubilize any free lime present in the mixture, an alkali metal salt of a water soluble aliphatic organic acid capable of forming calcium salts soluble in water, an alkali metal chloride capable of forming a soluble salt with the hypochlorite in an amount sufficient to solubilize all of the hydrochlorite in the mixture, and an oxidizing agent selected from the group consisting of the alkali metal salts of chromic and chloric acids, the oxidizing agent being sufficient in amount to keep the calcium salts in solution.

2. A composition of materials comprising a compound selected from the group consisting of calcium hypochlorite and calcium chloride, a dry water soluble acid selected from the group consisting of tartaric acid and citric acid in sufficient quantity to solubilize any free lime present in the said first mentioned compound, an oxidizing agent selected from the group consisting of alkali metal salts of chromic and chloric acids in an amount sufficient to prevent precipitation of calcium salts in solution, an alkali metal salt of a water soluble aliphatic organic acid capable of forming calcium salts soluble in water, and an alkali metal chloride capable of forming soluble salts with said first mentioned compound.

3. A composition of materials comprising a compound selected from the group consisting of calcium hypochlorite and calcium chloride, a dry water soluble acid selected from the group consisting of tartaric acid and citric acid in sufficient quantity to solubilize any free lime present in the said first mentioned compound, an oxidizing agent selected from the group consisting of alkali metal salts of chromic and chloric acids in an amount sufficient to prevent precipitation of calcium salts in solution, an alkali metal salt of a water soluble aliphatic organic acid capable of forming calcium salts soluble in water, and an alkali metal chloride capable of forming soluble salts with said first mentioned compound, said alkali metal chloride being present in an amount sufficient to solubilize all of the hypochlorite in the mixture.

4. A composition of materials comprising a compound selected from the group consisting of calcium hypochlorite and calcium chloride, a dry water soluble acid selected from the group consisting of tartaric acid and citric acid in sufficient quantity to solubilize any free lime present in the said first mentioned compound, an oxidizing agent selected from the group consisting of alkali metal salts of chromic and chloric acids in an amount sufficient to prevent precipitation of calcium salts in solution, an alkali metal salt of a water soluble aliphatic organic acid capable of forming calcium salts soluble in water, in an amount sufficient to enter into the reaction of all the materials and to cause rapid solubility of the mixture in water, and an alkali metal chloride capable of forming soluble salts with said first mentioned compound, said alkali metal chloride being present in an amount sufficient to solubilize all of the hypochlorite in the mixture.

5. A composition of materials comprising 15 to 50 parts of calcium hypochlorite, 3 to 10 parts of tartaric acid, 45 to 80 parts of sodium chloride, 2 to 10 parts of anhydrous sodium acetate, and .1 to 1 part of sodium chromate.

PAUL R. HERSHMAN.